United States Patent
Ito et al.

(10) Patent No.: US 7,236,186 B2
(45) Date of Patent: Jun. 26, 2007

(54) PORTABLE TERMINAL, SHOP-FRONT TERMINAL, COMMUNICATION SYSTEM AND COMMUNICATION METHOD

(75) Inventors: Daisuke Ito, Asaka (JP); Hisayoshi Tsubaki, Asaka (JP); Hiroshi Tanaka, Asaka (JP); Sugio Makishima, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 758 days.

(21) Appl. No.: 10/012,532

(22) Filed: Dec. 12, 2001

(65) Prior Publication Data
US 2002/0075229 A1    Jun. 20, 2002

(30) Foreign Application Priority Data
Dec. 15, 2000    (JP) ............................. 2000-382193

(51) Int. Cl.
  *H04N 5/225*    (2006.01)
(52) U.S. Cl. .................................. 348/207.2
(58) Field of Classification Search ............. 348/207.2, 348/207.1
See application file for complete search history.

(56) References Cited

U.S. PATENT DOCUMENTS

| | | | |
|---|---|---|---|
| 6,567,122 B1 * | 5/2003 | Anderson et al. ........ 348/211.3 |
| 6,603,506 B2 * | 8/2003 | Ogawa et al. ........... 348/207.2 |
| 6,938,004 B1 * | 8/2005 | McIntyre ...................... 705/27 |
| 2002/0111173 A1 * | 8/2002 | Hendrey et al. ............ 455/456 |
| 2002/0196344 A1 * | 12/2002 | McIntyre et al. ........ 348/207.1 |
| 2003/0122932 A1 * | 7/2003 | Shiohara .................. 348/207.2 |
| 2003/0122935 A1 * | 7/2003 | Shiohara .................. 348/207.2 |
| 2003/0151668 A1 * | 8/2003 | Hatakenaka et al. ..... 348/207.2 |
| 2004/0169730 A1 * | 9/2004 | Tamura et al. ........... 348/207.2 |
| 2005/0083407 A1 * | 4/2005 | Kokusho ................. 348/207.2 |

* cited by examiner

*Primary Examiner*—Vivek Srivastava
*Assistant Examiner*—James M. Hannett
(74) *Attorney, Agent, or Firm*—Birch, Stewart, Kolasch, & Birch, LLP (57) ABSTRACT

With the portable terminal, the shop-front terminal, the communication system and the communication method, a user can send service request information such as an image from the portable terminal to the shop-front terminal and receive services such as a print service and a digital content service. The communication system is composed of a portable terminal (electronic camera) provided with an inputting device with which the user inputs desired service contents and a transmitting and receiving device which sends service request information based on the above described service contents to the shop-front terminal wirelessly and a shop-front terminal provided with a device (print engine, etc.) which provides services such as a print service based on the service request information received from the portable terminal (electronic camera).

16 Claims, 7 Drawing Sheets

PORTABLE TERMINAL, SHOP-FRONT TERMINAL, COMMUNICATION SYSTEM AND COMMUNICATION METHOD

BACKGROUND OF THE INVENTION

1. Field of the Invention

The present invention relates to a portable terminal, a shop-front terminal, a communication system and a communication method and, in particular, to a portable terminal, a shop-front terminal, a communication system and a communication method with which a user can send service request information such as an image from the portable terminal to the shop terminal and receive a service such as a print service.

2. Description of the Related Art

Conventionally, there is known a print system with which a user brings an exposed negative film or the like, on which images are photographed with a silver salt camera, to a processing laboratory and a DP reception shop and then visits there to receive the images after processing such as the printing is completed.

In addition, in an electronic camera such as an electronic still camera, a captured image is recorded in a recording medium for image data such as a floppy disk and an LSI card. If an image captured with this electronic camera is printed by a printing device of a shop-front installed type or a communication apparatus provided with a printing device, a user directly operates the printer or the like of a shop-front installed type to execute printing. In this case, the user inserts the recording medium in the printer in accordance with an instruction on its display screen or the like and causes the printer to read the image data, thereby executing printing.

In addition, as another method, the user performs work such as transferring an image captured with an electronic camera to another communication device via a cellular phone.

However, when a method of inserting a recording medium in the conventional printer of a shop-front installed type (hereinafter abbreviated and referred to as shop-front terminal) to transfer image data is used, the shop-front terminal tends to suffer from a mischievous act such as stuffing a foreign body such as gum into an inserting portion for a recording medium of the shop-front terminal, whereby an inconvenience is caused in that the shop-front terminal becomes inoperable.

In addition, with the method of sending image data to another communication device via a cellular phone, since a current information transfer rate of a cellular phone is low relative to an amount of image data, an inconvenience is caused in that transfer of image data takes long and communication costs increase.

SUMMARY OF THE INVENTION

The present invention has been achieved in view of the above-described circumstances, and service request information is wirelessly sent from a portable terminal to a shop-front terminal which becomes a window for providing a service, and consequently it is possible to collectively process services requested from a plurality of users, and the shop-front terminal need not have any operational part. Accordingly, it is an object of the present invention to provide the shop-front terminal, the portable terminal and a communication system and a communication method, in which operability for the user is improved and any mischievous act is not easily brewed.

In order to attain the above-mentioned object, the invention is directed to a portable terminal with which a user sends service request information such as an image to a shop-front terminal and enjoys services such as a print service and a digital content service, which is characterized by comprising; an inputting device with which the user inputs desired service contents; and a short distance wireless transmitting device which sends service request information based on the above described service contents to the shop-front terminal wirelessly.

According to the present invention, since the portable terminal is provided with the inputting device with which a user inputs desired service contents and the short distance wireless transmitting device which sends service request information based on the above described service contents to a shop-front terminal wirelessly, it is possible for the user to receive a desired service without directly operating the shop-front terminal.

The present invention is also directed to a shop-front terminal that becomes a window for receiving service request information such as an image from a portable terminal owned by a user and providing the user with services such as a print service and a digital content service, which is characterized by comprising: a short distance wireless transmitting device which sends service provision information concerning a service to be wirelessly provided to the portable terminal; and a device which provides services such as a print service and a digital content service based on the service request information received from the portable terminal.

According to the present invention, since the shop-front terminal is provided with the short distance wireless transmitting device which sends service provision information concerning a service to be provided to a portable terminal wirelessly and the device which provides services such as a print service and a digital content service based on the service request information received from the portable terminal, operability for a user is improved and the shop-front terminal does not easily suffer from a mischievous act.

The present invention is also directed to a communication system with which a user sends information such as an image from a portable terminal carried by the user to a shop-front terminal and enjoys services such as a print service and a digital content service, which is characterized by comprising: a portable terminal provided with an inputting device with which the user inputs desired service contents and a short distance wireless transmitting device which sends service request information based on the above described service contents to the shop-front terminal wirelessly; and a shop-front terminal provided with a device which provides services such as a print service and a digital content service based on service request information received from the portable terminal.

According to the present invention, since the communication system is composed of the portable terminal provided with the inputting device with which the user inputs desired service contents and the short distance wireless transmitting device which sends service request information based on the above described service contents to the shop-front terminal wirelessly and the shop-front terminal provided with the device which provides services such as a print service and a digital content service based on service request information received from the portable terminal, it is possible to realize a communication system that offers improved operability for a user and does not easily suffer from a mischievous act.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiments of a portable terminal, a shop-front terminal, a communication system and a communication method in accordance with the present invention will be hereinafter described with reference to drawings.

Figure 1:
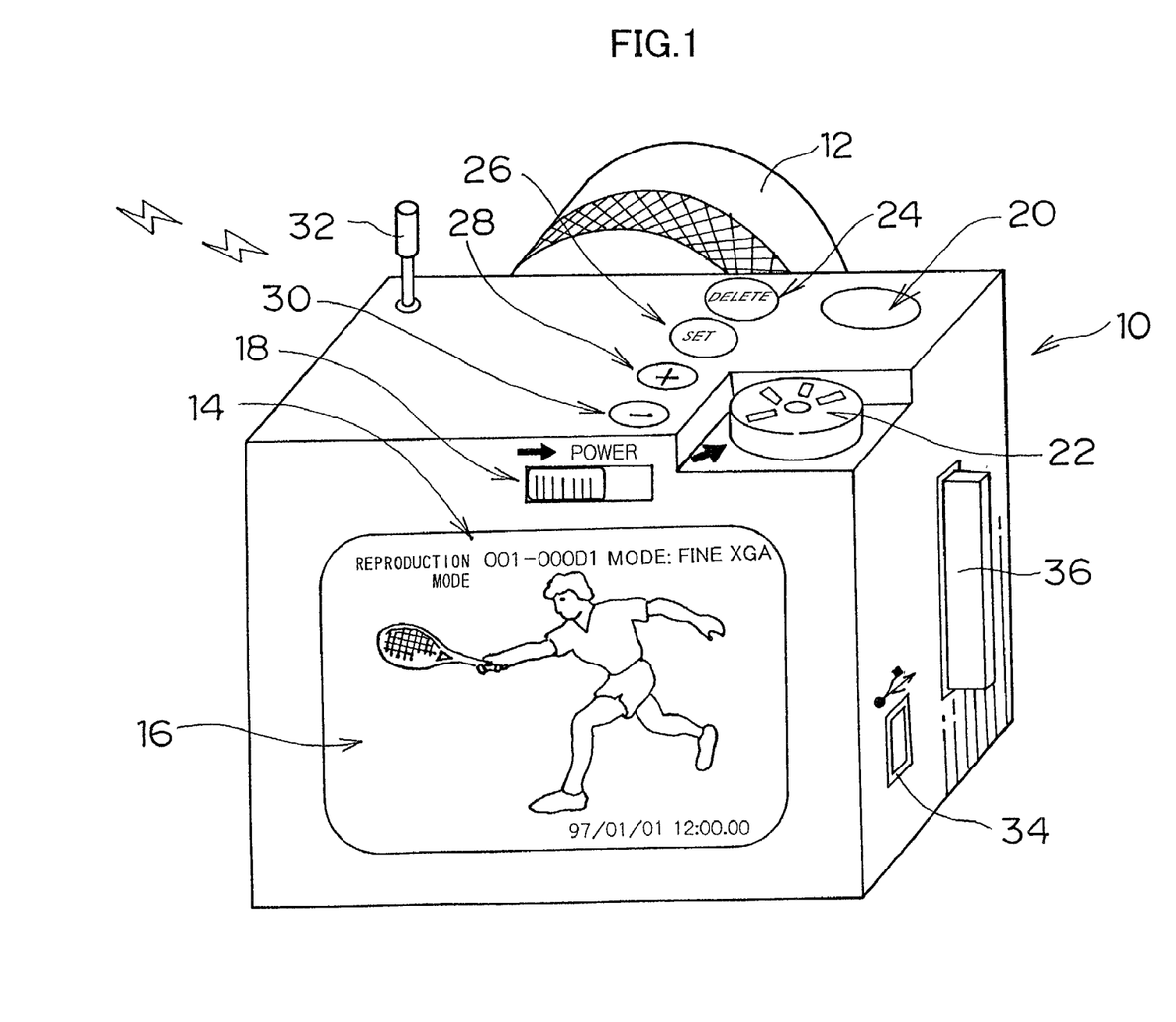
FIG. 1 is an external perspective view of an electronic camera that is a form of a communication device.

FIG. 1 shows an external perspective view of an electronic camera that is a form of a portable terminal provided with a wireless communication device.

According to the drawing, an electronic camera 10 is provided with a taking lens 12 for imaging a subject image on an image pick-up device, a displaying device 16 which displays image data and various kinds of information such as a communication state and a frame number display 14, a power source switch 18 for inputting activation and stop of functions of the electronic camera 10, a release button 20 with which a user instructs image-capturing, a mode switching dial 22 for switching to set various modes provided in the electronic camera 10, an erasing button 24 for designating a desired item in erasing the desired item from items displayed on the displaying device 16, a setting button 26 for registering a desired item from items displayed on the displaying device 16, an increment button 28 that is operated when a frame number or the like displayed on the displaying device 16 is to be incremented and a decrement button 30 that is operated when a frame number or the like displayed on the displaying device 16 is to be decremented.

In addition, an antenna 32 for sending and receiving a carrier wave and data when information such as image data and voice data is sent to or received from an external apparatus by wireless communication, a communication connector 34 that is used in performing wire communication and a recording medium inserting portion 38 that is used when information is exchanged via an detachable recording medium 36.

Figure 2:
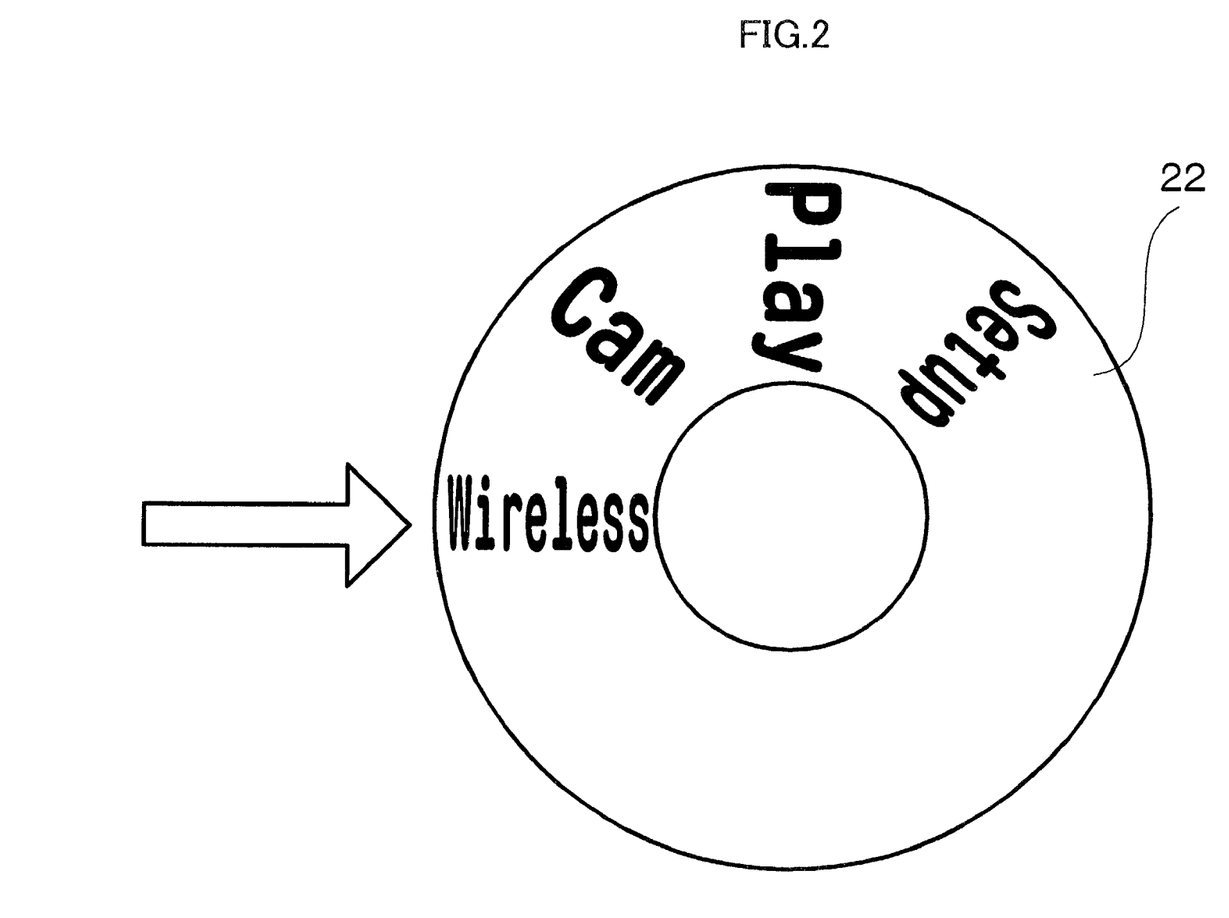
FIG. 2 is a view showing various setting modes provided in a mode switching dial.

FIG. 2 is a view showing an indication of various setting modes provided in the mode switching dial 22.

According to the drawing, on the mode switching dial 22, there are shown a communication mode for carrying out wireless communication with other communication devices (shown as Wireless in FIG. 2), a image-capturing mode for carrying out image-capturing (shown as Cam in FIG. 2), a reproducing mode for carrying out reproduction of a recorded image (shown as Play in FIG. 2) and a set-up mode for setting the date, the image-capturing mode, the number of image-capturing pixels, an automatic turning-off time of a power source, a volume of alarm sound or the like. A user can set each mode of the electronic camera 10 by switching the mode switching dial 22.

Figure 3:
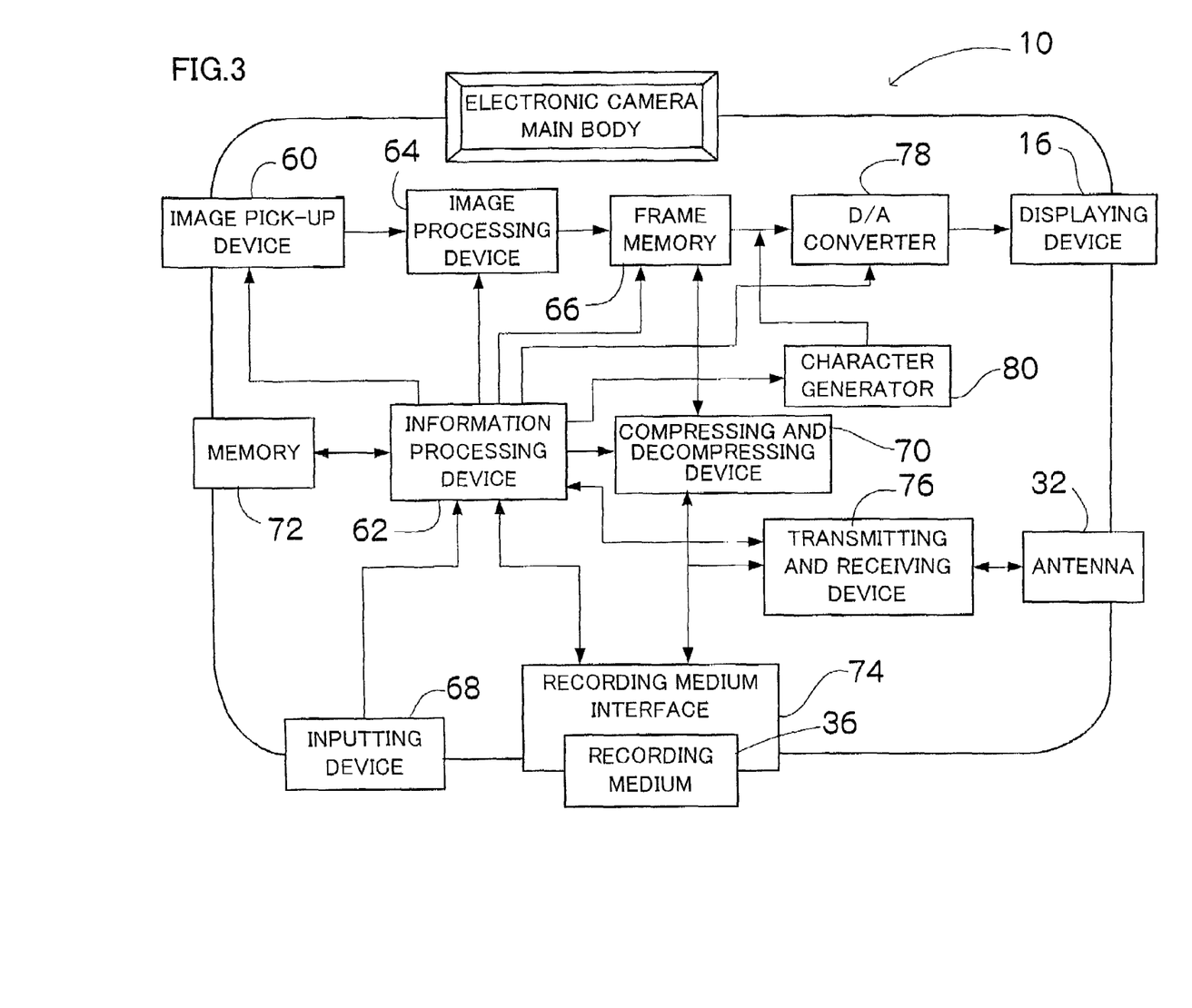
FIG. 3 is a block diagram of an electronic camera.

FIG. 3 is a block diagram of the electronic camera 10.

The electronic camera 10 is provided with an image pick-up device 60 which images an image of a subject on a light-receiving surface to photoelectrically convert it and outputs the converted image as image data, an information processing device 62 which performs control of the entire electronic camera 10 and, at the same time, performs control such as sampling timing control of image data, recording control of image data, pattern recognition of image data, blink recognition of image data, processing for reading type information or identification information of the electronic camera 10, generating processing of a random number for identification, communication control and display control and processing such as generation of a print order file, an image processing device 64 which performs processing such as change of an image size, sharpness correction, gamma correction, contrast correction and white balance correction and a frame memory 66 in which image data is temporarily stored.

In addition, the electronic camera 10 is provided with an inputting device 68 on which a release button, a communication button, a transmission button, a function switch, a crucifix key, a decision switch, a mode switching switch or the like are provided, a compressing and decompressing device 70 which controls to compress information such as image data with a method represented by JPEG and Motion JPEG or controls to extend and develop compressed data and a recording medium interface 74 for converting image data in order to record the image data in a detachable recording medium 36 and read the image data therefrom. The recording medium 36 is a detachable recording medium represented by a semiconductor recording medium, a magnetic recording medium and an optical recording medium such as a memory card and an MO.

Connected to the information processing device 62 is a memory 72 including a ROM in which a type name and a peculiar number such as a serial number of the electronic camera 10, an operation program and various constants are stored and a RAM that is a storing device to be a work area when a program is executed.

A wireless communication device of the electronic camera 10 which is used for sending and receiving image data or the like to and from an external apparatus by communication is composed of a transmitting and receiving device 76 (including functions of a short distance wireless transmitting device and a short distance wireless receiving device) which sends or receives image data and service request information on a carrier wave according to an instruction from the information processing device 62 and an antenna 32 for sending and receiving a carrier wave and data.

In addition, the electronic camera 10 is provided with a D/A converter 78 for displaying information concerning a connected apparatus and image data on the displaying device 16 and a character generator 80 for converting identification information instructed by the information processing device 62 into data of characters and a message to be displayed.

Image-capturing processing of the electronic camera 10 configured as described above will be described.

An image to be captured is imaged on a light receiving surface of an image pick-up device 60 and an imaged subject image is photoelectrically converted and outputted to the image processing device 64. Image data obtained in this way is applied to amplification and processing for reducing noise by the image processing device 64 and temporarily stored in the frame memory 66. The information processing device 62 sequentially communicates the image data stored in the frame memory 66 to the D/A converter 78 and displays it on the displaying device 16.

When the release button provided in the inputting device 68 is pressed, the processing enters a mode for image-capturing a subject. Then, the information processing device 62 transfers the image data stored in the frame memory 66 to the compressing and decompressing device 70 and outputs an instruction to carry out compressing processing of the image data on predetermined conditions. The information processing device 62 then applies processing for sequentially recording the image data in the recording medium 36 to the recording medium interface 74.

In addition, when communication is established with another connected apparatus and the transmission button provided in the inputting device 68 is pressed, the information processing means 62 sequentially reads service request information such as designated image data and a print order file from the recording medium 36 and converts the information into a predetermined data format and, then, executes processing for sending it to an external communication terminal via the transmitting and receiving device 76 and the antenna 32. In addition, a user may prepare the above described print order file in advance by operating the inputting device 68.

Figure 4:
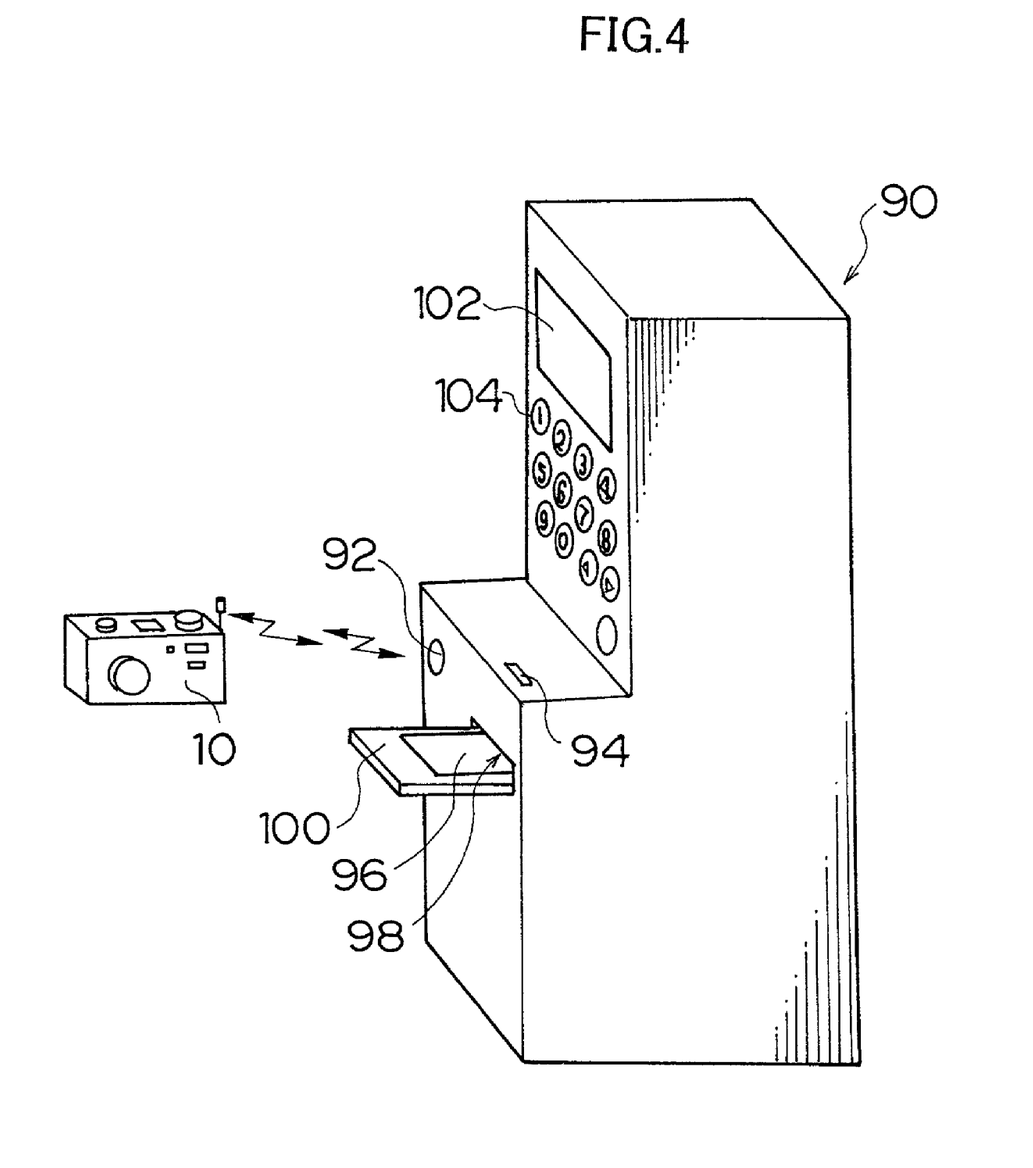
FIG. 4 is a perspective view showing a state in which an electronic camera and a shop-front vending machine are executing wireless communication.

FIG. 4 shows a state in which an electronic camera and a shop-front terminal are executing wireless communication.

As shown in the drawing, a shop-front terminal 90 that becomes a window for providing a user with various services can send and receive information to and from the electronic camera 10 by wireless communication. When not-shown one or more users bring one or more electronic cameras 10, approach the shop-front terminal 90 and operate the inputting device of the electronic camera 10 to input service contents, the electronic camera 10 can generate service request information including an image or the like and transmit it to the shop-front terminal 90 for printing.

If a user instructs the shop-front terminal 90 to perform a print service of an image recorded in the electronic camera 10, the electronic camera 10 may prepare a print condition file including a file name of the image, the number of prints, a print size, a method of payment of a print charge, information concerning a delivery destination of a printed product, identification information peculiar to the electronic camera 10, identification information of the user or the like based on the image and print information inputted by the user and send the file to the shop-front terminal 90 together with the image. Upon receiving the image and the print condition file, the shop-front terminal 90 prints the image based on the print condition described in the print condition file and outputs it.

Further, the portable terminal is not limited to an electronic camera and any portable terminal such as a personal computer, a cellular phone and an audio apparatus can attain the object of the present invention as long as it is provided with a wireless communication device.

The shop-front terminal 90 is provided with an antenna 92 that is capable of communicating with a communication device such as the electronic camera 10 wirelessly, a charge inserting port 94 in which a user inserts a charge for using the shop-front terminal 90, a print discharge port 98 through which a print sheet 96 on which an image is printed is discharged and a tray 100 for guiding the print sheet 96 which is printed an image thereon and discharged.

In addition, the shop-front terminal 90 is provided with a displaying device 102 which displays a communication state, identification information peculiar to the electronic camera 10 connected to it by communication, an image or the like and an inputting device 104 including input keys with which a user inputs identification information or the like.

Figure 5:
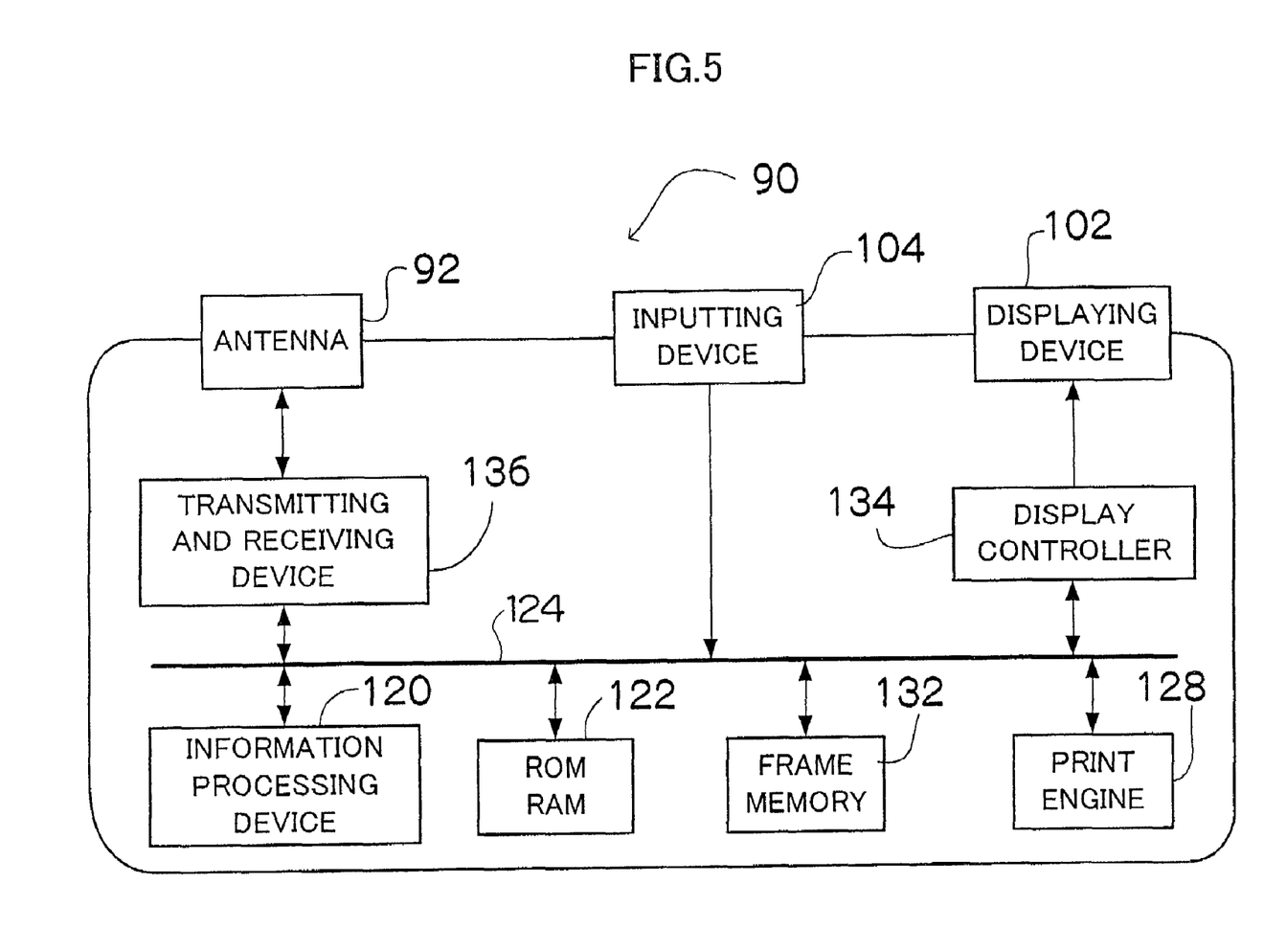
FIG. 5 is a block diagram of a signal processing system of a shop-front vending machine.

FIG. 5 shows a block diagram of an information processing system of the shop-front terminal 90.

According to the drawing, the information processing system of the shop-front terminal 90 in accordance with the present invention is provided with an information processing device 120 which performs control of the entire shop-front terminal 90, a memory 122 including a ROM in which a program for causing the information processing device 120 to operate, various constants or the like are written and a RAM that becomes a work area when the information processing device 120 executes processing, a displaying device 102 which displays information for a user and an inputting device 104 with which a user inputs a code for identification and various information.

The image signal processing system of the shop-front terminal 90 is provided with a print engine 128 (a device which provides a print service) that is a printing device including a mechanism portion for printing obtained image and character information and a frame memory 132 for temporarily storing information to be displayed on a displaying device such as an external monitor. The frame memory 132 sequentially communicates image data to a display controller 134 at a predetermined frame rate. In addition, the display controller 134 converts image data to be displayed into a video signal suitable for the displaying device 102 to display and sends it to the displaying device 102, on which an image and characters are displayed.

The communication device of the shop-terminal 90 which is used in sending and receiving image data or the like to and from an external apparatus by communication is composed of a transmitting and receiving device 136 (including functions of a short distance wireless transmitting device and a short distance wireless receiving device) which sends or receives image data by an instruction from the information processing device 120 and an antenna 92 for sending and receiving a carrier wave and data.

The information processing device 120 within the shop-front terminal 90 and each peripheral circuit including the memory 122, the display controller 134, the inputting device 104, the print engine 128, the frame memory 132 and the transmitting and receiving device 136 are connected by a bus 124. The information processing device 120 can control the respective peripheral circuits.

The communication device to be used when the electronic camera 10 and the shop-front terminal 90 perform wireless communication is a communicating device using an electric wave, a ultrasonic wave, an infrared ray or the like as a carrier wave. If an infrared ray is used for the communication device, operability is improved by utilizing a communicating device using diffused light that is capable of performing communication in a wide range.

Further, a network communicating device which is connectable by communication to an external network such as the Internet may be provided in the shop-front terminal 90 to send service request information received from the electronic camera 10 to another communication device connected to the network.

When a user desires to print an image that is a kind of a service content provided by the shop-front terminal 90 and designates and sends the image to be printed, the user operates the inputting device 68 of the electronic camera 10 first to set the processing mode in a communication mode. Thereafter, communication is automatically established between the electronic camera 10 and the shop-front terminal 90. For example, if a plurality of users carry other portable terminals, respectively, near the shop-front terminal 90, it is possible that a plurality of portable terminals are connected to one shop-front terminal 90 so as to enable wireless communication. If a plurality of portable terminals exist in an area where wireless communication is possible and are connected with a plurality of portable terminals so as to enable wireless communication as described above, it is necessary to correctly specify portable terminals carried by a specific user and carry out transmission and reception of information among the specified apparatuses thereafter.

In specifying portable terminals, a common code (identification information such as numerals and characters such as alphabet) is set among portable terminals desiring to communicate with each other and communication is carried out only among the apparatuses having the set common code. The specification of portable terminals is called pairing. The above described common code may be arranged such that, for example, the electronic camera 10 issues (generates) a code equivalent to an ID peculiar to an apparatus and displays it on the displaying device 16 of the electronic camera 10 and a user reads the code and inputs it via the inputting device 104 of the shop-front terminal 90.

The above described code peculiar to an apparatus issued by the electronic camera 10 may be, for example, a code such as a manufacturer name, a type name or a serial number of the electronic camera 10 or a code that is combination of each piece of the information or may be a code issued as a random number each time. In addition, if a user remembers a code peculiar to the electronic camera 10 in advance, the user may directly input the code in the inputting device 104 of the shop-front terminal 90 without causing the electronic camera 10 to display it. The shop-front terminal 90 specifies the electronic cameras 10 having the code inputted by the user to transmit and receive information thereafter, thereby carrying out the pairing.

When the pairing is finished, a directory (including a path name and a directory name) in which information such as an image is recorded and image file information are displayed on the displaying device 16 of the electronic camera 10 by means of character display or tree display. Then, when a user operates the increment button 28, the decrement button 30 or the like provided in the inputting device 68 to select a desired image file and select a content that the user utilizes, if necessary, the designated image file is sent to an apparatus that is a transmission destination.

Further, in addition to a print of the image, a content to be provided by the shop-front terminal 90 may be a service for uploading an image or voices to a specific site, a service for downloading an image or voices from a specific site or shop-front terminal 90, a service for purchasing goods, a service for distributing a map, a service for distributing game software or the like.

In addition, the pairing may be arranged such that an identification number peculiar to the electronic camera 10 or a code to be a connection key is read on the shop-front terminal 90 side and information accompanying it is centrally managed on the shop-front terminal 90 side.

Figure 6:
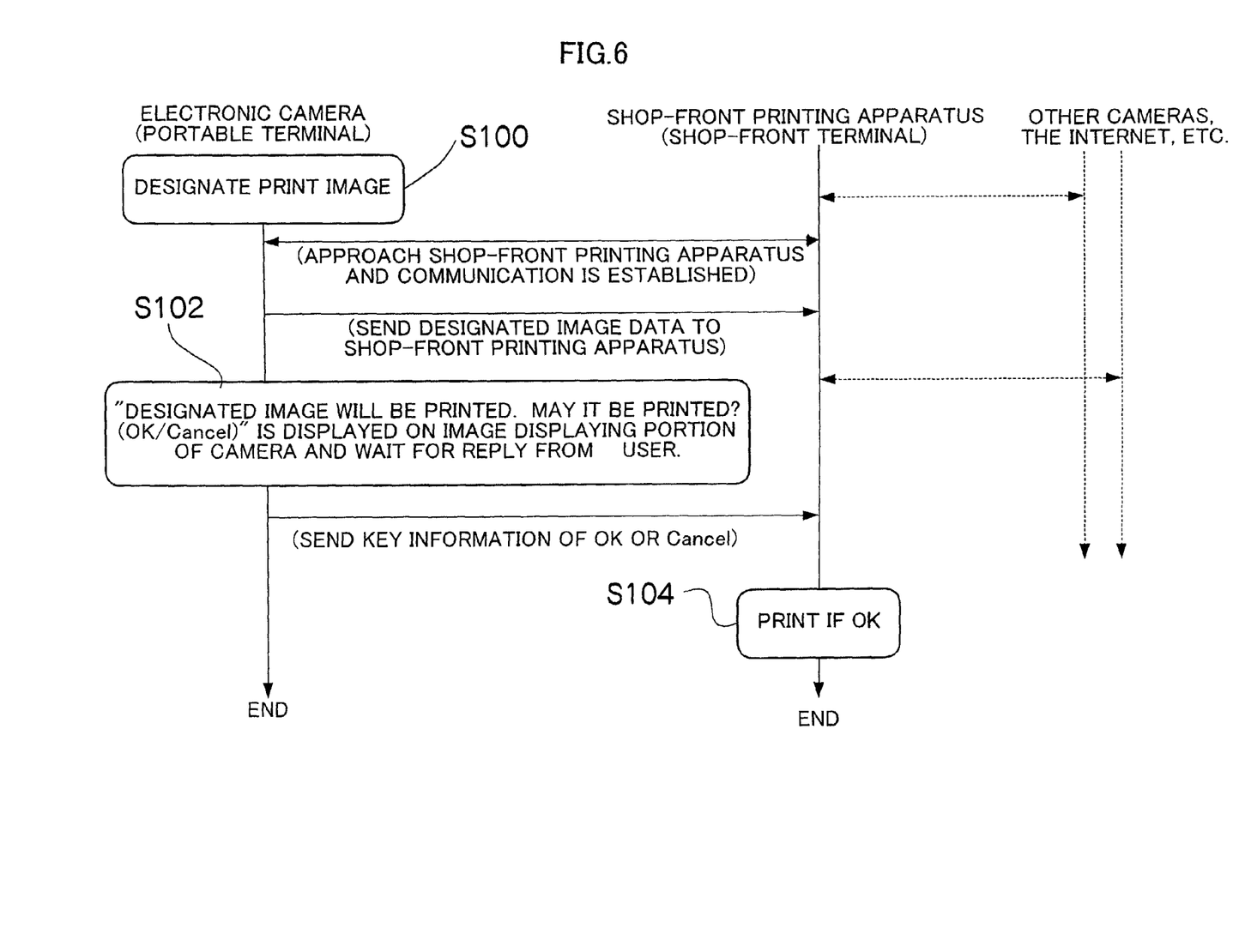
FIG. 6 is a flow chart of communication processing that is carried out by an electronic camera and a shop-front terminal.

FIG. 6 shows a flow chart of communication processing that is carried out by an electronic camera and a shop-front terminal.

The drawing is a flow chart in the case in which a user prepares a print order file or the like from the electronic camera 10 and makes designations for printing in advance and, then, sends an image and print order information to the shop-front terminal 90 to receive a print of the image (printed product).

According to the drawing, a user operates the inputting device 68 of the electronic camera 10 to input desired service contents in advance in step S100 "designate a print image" (hereinafter abbreviated and written as S100). The information processing device 62 of the electronic camera 10 prepares service request information such as the above-mentioned print order file based on the inputted service contents.

If, for example, the user sets the electronic camera 10 in a state in which wireless communication is possible by setting the mode switching dial of the electronic camera 10 in "Wireless" and approaches the shop-front terminal 90 to bring the electronic camera 10 into a distance where the shop-front terminal 90 and the electronic camera 10 can communicate with each other wirelessly, the communication devices of the electronic camera 10 and the shop-front terminal 90 automatically establish communication. Further, the shop-front terminal 90 is capable of communicating with a plurality of communication device simultaneously via another electronic camera and a communication line such as the Internet.

When the wireless communication is established, the electronic camera 10 sends service request information such as an image and a print order file based on the service contents inputted by the user to the shop-front terminal 90. When the shop-front terminal 90 receives the service request information sent from the electronic camera 10 and confirms the service contents, the shop-front terminal 90 sends information requesting the electronic camera 10 to confirm that the service may be carried out.

In the next S102, the electronic camera 10 shows an indication such as "Designated image will be printed. May it be printed? (OK/Cancel)" on the displaying device 16 based on the above described information requesting confirmation of the service and performs processing for waiting for an instruction from the user. If an instruction such as OK or Cancel is received from the user via the inputting device 68, the electronic camera 10 performs processing for sending the information inputted by the user to the shop-front terminal 90.

Upon receiving the above described information indicating "OK" inputted by the user, the shop-front terminal 90 performs processing for printing an image, which is designated by the print order file or the like, in step S104. In addition, if a method of payment of a charge is described in the print order file or the like, the shop-front terminal 90 demands payment of the charge based on the method of payment of a charge. In addition, if a delivery destination of a printed product is described, the shop-front terminal 90 delivers it to a predetermined delivery destination.

Figure 7:
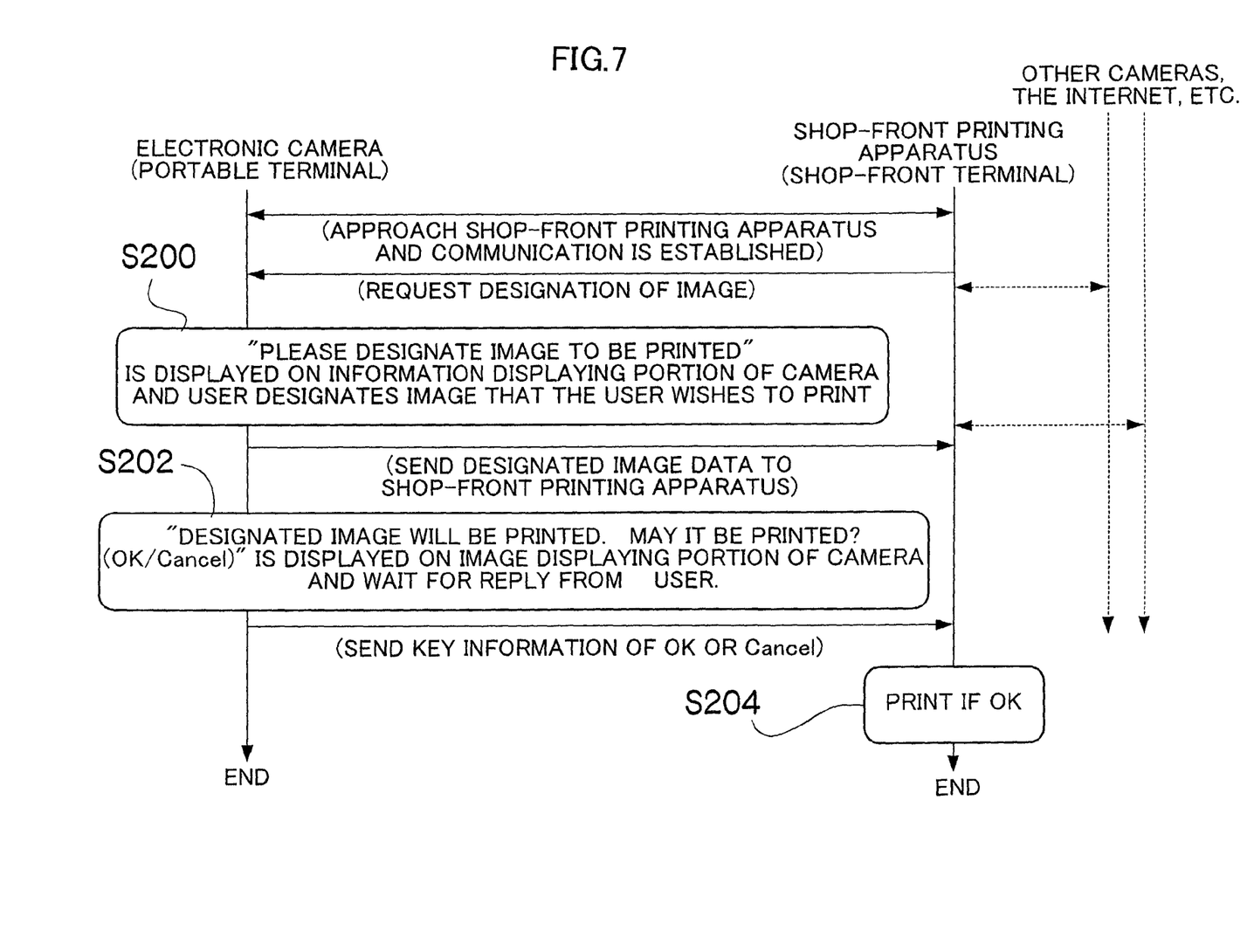
FIG. 7 is a flow chart of communication processing that is carried out by an electronic camera and a shop-front terminal.

FIG. 7 shows a flow chart of communication processing according to another embodiment carried out by an electronic camera and a shop-front terminal.

The drawing is a flow chart in the case in which wireless communication is started with the shop-front terminal 90 without a print order file or the like prepared in advance in the electronic camera 10 and a user inputs an image and print order information in the electronic camera 10 and, then, sends the service request information to the shop-front terminal 90 to receive a print of the image (printed product).

If, for example, the user sets the electronic camera 10 in a state in which wireless communication is possible by setting the mode switching dial of the electronic camera 10 in "Wireless" and approaches the shop-front terminal 90 to bring the electronic camera 10 into a distance where the shop-front terminal 90 and the electronic camera 10 can communicate with each other wirelessly, the communication devices of the electronic camera 10 and the shop-front terminal 90 automatically establish communication. When the wireless communication is established, the shop-front terminal 90 sends service provision information (information requesting transmission of service request information such as designation of an image) to the electronic camera 10.

When the electronic camera 10 receives the above described service provision information, the processing carried out by the information processing device 62 advances to S200. The information processing device 62 shows an indication such as "Please designate an image to be printed" on the displaying device 16 and waits for an instruction of the user.

When the user designates a file name or the like of an image that the user desires to print via the inputting device 68 (including inputting work of service contents), the electronic camera 10 performs processing for sending service request information based on the service contents inputted by the user to the shop-front terminal 90. In this case, the information processing device 62 of the electronic camera 10 may prepare service request information such as a print order file based on the service contents inputted by the user and send it to the shop-front terminal 90.

When the shop-front terminal 90 receives the service request information sent from the electronic camera 10 and confirms the service contents, the shop-front terminal 90 sends information requesting the electronic camera 10 to confirm that the service may be carried out.

In the next S202, the electronic camera 10 shows an indication such as "Designated image will be printed. May it be printed? (OK/Cancel)" on the displaying device 16 based on the above described information requesting confirmation of the service and performs processing for waiting for an instruction from the user. If an instruction such as OK or Cancel is received from the user via the inputting device 68, the electronic camera 10 performs processing for sending the information inputted by the user to the shop-front terminal 90.

Upon receiving the above described information indicating "OK" inputted by the user, the shop-front terminal 90 performs processing for printing an image, which is designated by the print order file or the like, in step S204. In addition, if a method of payment of a charge is described in the print order file or the like, the shop-front terminal 90 demands payment of the charge based on the method of payment of a charge. In addition, if a delivery destination of a printed product is described, the shop-front terminal 90 delivers it to a predetermined delivery destination.

Further, the above-described embodiment is described with reference to the example in which the shop-front terminal 90 is provided with the inputting device 104 and the displaying device 102. However, according to the present invention, since presentation of information and transmission of service request information to a shop-front terminal are performed according to an instruction of a portable terminal, a user can receive a service without touching the shop-front terminal except the time when the user receives a printed product. Therefore, the object of the present invention can be attained without particularly providing a user interface such as the above described inputting device 104 and displaying device 102 in the shop-front terminal 90.

As described above, according to the portable terminal in accordance with the present invention, since an inputting device with which a user inputs desired service contents and a short distance wireless transmitting device which sends service request information based on the above described service contents to a shop-front terminal wirelessly are provided, the user can receive a desired service without directly operating the shop-front terminal.

In addition, according to the shop-front terminal in accordance with the present invention, a short distance wireless transmitting device which sends service provision information concerning a service to be provided to a portable terminal wirelessly and a device which provides a service such as a print service and a digital content service based on service request information received from the portable terminal are provided, operability for a user is improved and the shop-front terminal does not easily suffer from a mischievous act.

In addition, according to the communication system in accordance with the present invention, since the communication system is composed of a portable terminal provided with an inputting device with which the user inputs desired service contents and a short distance wireless transmitting device which sends service request information based on the above described service contents to a shop-front terminal wirelessly; and a shop-front terminal provided with a device which provides services such as a print service and a digital content service based on service request information received from the portable terminal, it is possible to realize a communication system that offers improved operability for a user and does not easily suffer from a mischievous act.

In addition, according to the present invention, since it is possible to send a common code to be used in establishing wireless communication among portable terminals and processing such as updating of a processing program of a portable terminal from a shop-front terminal at the time of wireless communication, it becomes possible for a processing program of a portable terminal to cope with a shop-front terminal provided with a latest processing capability in communicating with the shop-front terminal.

In addition, according to the present invention, since a shop-front terminal can process service requests issued by a plurality of users simultaneously, a user is not forced to wait for its turn and can use the shop-front terminal comfortably. Further, since an image is transferred by wireless communication with weak current, it is possible to prevent a mischievous act such as stuffing a foreign body such as gum into an inserting portion for a recording medium of the shop-front terminal from happening.

In addition, according to the present invention, since a portable terminal can communicate with a shop-front terminal connected to a communication network and the shop-front terminal can send information such as an image to a communication apparatus in a remote place from the portable terminal via the communication network, it becomes possible to carry out transmission of information far less expensively compared with the case in which information such as an image is sent via a public line.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A portable terminal with which a user sends service request information such as an image to a shop-front terminal and enjoys services such as a print service and a digital content service, the portable terminal comprising:
   an inputting device with which the user inputs desired service contents;
   a short distance wireless transmitting device which sends service request information based on the service contents to the shop-front terminal wirelessly;
   an image pick-up device which picks up an image of a subject;
   a short distance wireless receiving device which receives menu information concerning a service to be provided from the shop-front terminal wirelessly;
   a processor which sequentially reads service request information including designated image data and a print order file from a recording medium, converts the information into a predetermined data format and executes processing for transmitting it to the shop front terminal; and
   a displaying device which displays the received menu information,
   wherein the short distance wireless transmitting device sends an image based on the service contents to the shop-front terminal wirelessly, and
   wherein the short distance wireless receiving device receives a service provision information from the shop-front terminal, the service provision information requesting transmission of service request information; and
   the short distance wireless transmitting device sends a service request information prepared based on a service content inputted by the user according to the service provision information.

2. The portable terminal of claim 1, wherein the portable terminal and the shop-front terminal automatically establish communication when the portable terminal comes into a distance where the shop-front terminal and the portable terminal can communicate with each other, and wherein, upon automatically establishing communication, the short distance wireless transmitting device of the portable terminal sends the service request information to the shop-front terminal wirelessly.

3. The portable terminal according to claim 1, wherein the menu information contains at least one of:
   an information of a service for uploading an image or voices to a specific site;
   an information of a service for downloading an image or voices from a specific site or a shop-front terminal;
   an information of a service for purchasing goods;
   an information of a service for distributing a map; and
   an information of a service for distributing game software.

4. The portable terminal according to claim 3, wherein the portable terminal is any of a personal computer, a cellular phone, and an audio apparatus.

5. The portable terminal according to claim 1, wherein the service request information includes identification information for specifying a user.

6. The portable terminal according to claim 5, wherein the menu information contains at least one of:
   an information of a service for uploading an image or voices to a specific site;
   an information of a service for downloading an image or voices from a specific site or a shop-front terminal;
   an information of a service for purchasing goods;
   an information of a service for distributing a map; and
   an information of a service for distributing game software.

7. The portable terminal according to claim 6, wherein the portable terminal is any of a personal computer, a cellular phone, and an audio apparatus.

8. A shop-front terminal that becomes a window for receiving service request information such as an image from a portable terminal owned by a user and providing the user with services such as a print service and a digital content service, the shop-front terminal comprising:
   a short distance wireless transmitting device which sends service provision information concerning a service to be wirelessly provided to the portable terminal; and
   a device which provides services such as a print service and a digital content service based on the service request information received from the portable terminal,
   wherein the short distance wireless transmitting device sends a service provision information to the portable terminal, the service provision information requesting transmission of service request information, and wherein the shop-front terminal sends a common code to be used in establishing wireless communication and processing including updating of a processing program of the portable terminal.

9. A communication system with which a user sends information such as an image from a portable terminal carried by the user to a shop-front terminal and enjoys services such as a print service and a digital content service, the communication system comprising:
   a portable terminal provided with an inputting device with which the user inputs desired service contents and a short distance wireless transmitting device which sends service request information based on the service contents to the shop-front terminal wirelessly; and
   a shop-front terminal provided with a device which provides services such as a print service and a digital content service based on service request information received from the portable terminal, wherein
   the portable terminal is portable terminal comprising:
   an inputting device with which the user inputs desired service contents;
   a short distance wireless transmitting device which sends service request information based on the service contents to the shop-front terminal wirelessly;
   an image pick-up device which picks up an image of a subject;
   a short distance wireless receiving device which receives menu information concerning a service to be provided from the shop-front terminal wirelessly; and
   a displaying device which displays the received menu information,
   wherein the short distance wireless transmitting device sends an image based on the service contents to the shop-front terminal wirelessly, and
   wherein the short distance wireless receiving device receives a service provision information from the shop-front terminal, the service provision information requesting transmission of service request information; and the short distance wireless transmitting device sends a service request information prepared based on a service content inputted by the user according to the service provision information; and the shop-front terminal is a shop-front terminal of claim 8.

10. The shop-front terminal according to claim 8, wherein the service provision information contains at least one of:
an information of a service for uploading an image or voices to a specific site;
an information of a service for downloading an image or voices from a specific site of a shop-front terminal;
an information of a service for purchasing goods;
an information of a service for distributing a map; and
an information of a service for distributing game software.

11. The shop-front terminal of claim 8, wherein the portable terminal and the shop-front terminal automatically establish communication when the portable terminal comes into a distance where the shop-front terminal and the portable terminal can communicate with each other, and wherein, upon automatically establishing communication, the short distance wireless transmitting device of the shop-front terminal sends the service provision information to the portable terminal wirelessly.

12. The ship-front terminal according to claim 8, wherein the shop-front terminal receives a service request information prepared by the portable terminal according to the sent service provision information.

13. The shop-front terminal according to claim 12, further comprising a network communication device connected to an external network, the network communication device which sends the service request information received from the portable terminal.

14. A communication method with which a user sends information such as an image from a portable terminal carried by the user to a shop-front terminal and enjoys services such as a print service and a digital content service, the communication method comprising:
a step in which the user inputs desired service contents in the portable terminal;
a step in which the portable terminal sends service request information based on the service contents inputted by the user to the shop-front terminal wirelessly; and
a step in which the shop-front terminal provides services such as a print service and a digital content service based on the service request information received from the portable terminal,
a step in which the portable terminal receives a service provision information from the shop-front terminal, the service provision information requesting transmission of service request information;
a step in which the portable terminal sends service request information prepared according to the service provision information; and
a step in which the shop-front terminal sends the service provision information requesting transmission,
wherein the portable terminal sequentially reads service request information including designated image data and a print order file from a recording medium, converts the information into a predetermined data format and executes processing for sending it to the shop-front terminal.

15. The communication method according to claim 14, further comprising a step in which the shop-front terminal sends the service request information received from the portable terminal to an external network.

16. The communication method of claim 14, wherein the portable terminal and the shop-front terminal automatically establish communication when the portable terminal comes into a distance where the shop-front terminal and the portable terminal can communicate with each other.

* * * * *